UNITED STATES PATENT OFFICE.

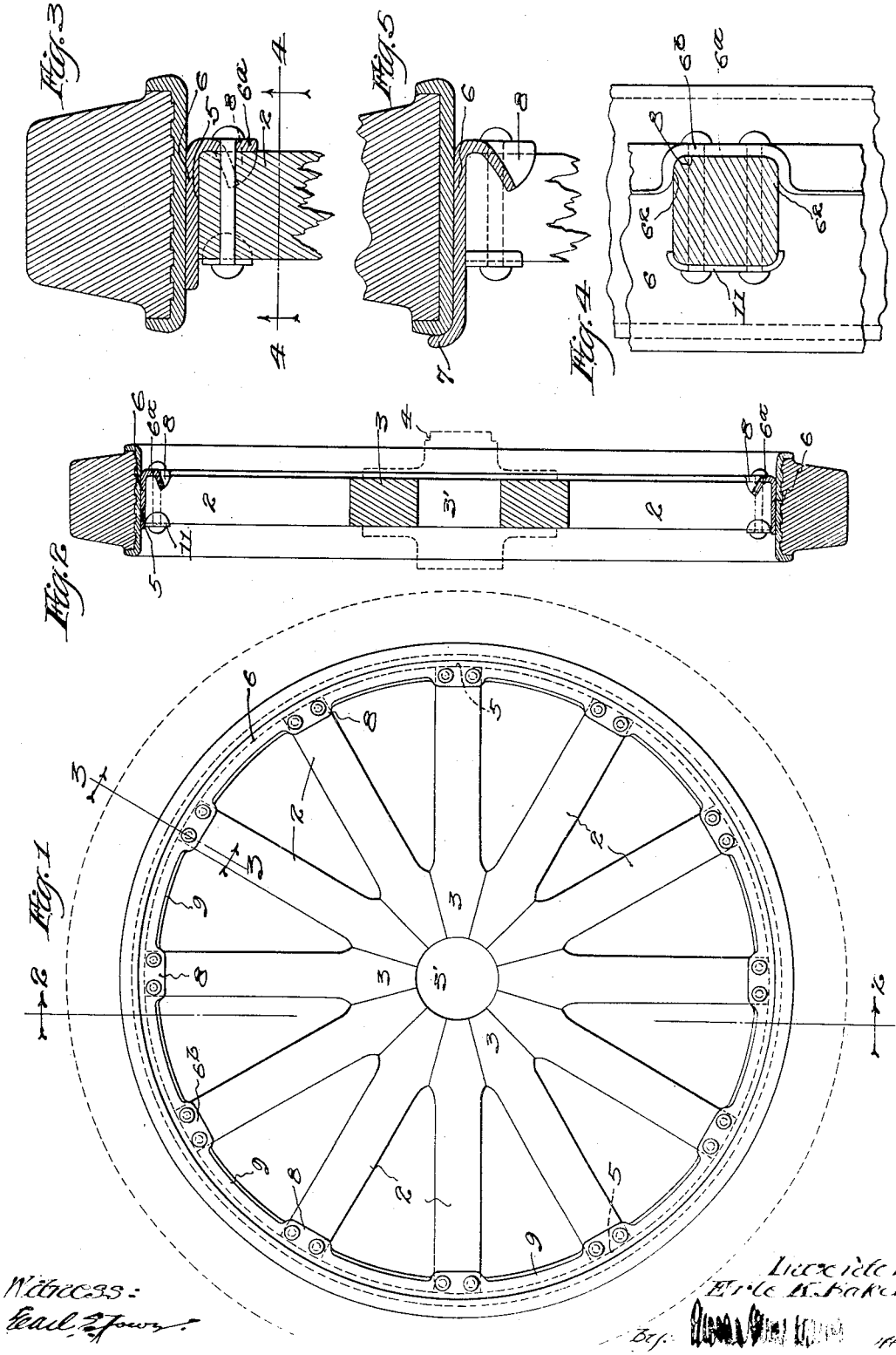

ERLE KING BAKER, OF CHICAGO, ILLINOIS, ASSIGNOR TO BAKER WHEEL & RIM COMPANY, OF CHICAGO, ILLINOIS, A CORPORATION OF ILLINOIS.

SEMIWOOD WHEEL FOR MOTOR-VEHICLES.

1,336,336.  Specification of Letters Patent.  Patented Apr. 6, 1920.

Application filed November 14, 1918. Serial No. 262,553.

*To all whom it may concern:*

Be it known that I, ERLE K. BAKER, a citizen of the United States, and a resident of Chicago, county of Cook, and State of Illinois, have invented certain new and useful Improvements in Semiwood Wheels for Motor-Vehicles, of which the following is a specification.

The invention relates to motor vehicle wheels of the kind equipped with solid tires, the tires being carried by metal rims or bases made separate from the wheel but pressed, shrunk, or otherwise attached thereto in a manner to prevent their accidental disengagement therefrom.

The object of my invention is to simplify the construction of such wheels; to lessen the number of parts therein; to increase the strength thereof; to enhance their resilience; to increase their durability; to render them immune from the effects of changing climatic conditions; to lessen the weight of such wheels, to materially reduce the cost thereof, and the time and labor required for their manufacture, and to adapt them to receive solid tire bases or rims of all sorts intended to be permanent thereon.

My invention resides in a wheel wherein these objects are attained, and the construction, functions, and merits of which will be understood from the accompanying drawings and the following description.

In said drawings, Figure 1 depicts my improved wheel in a form adapted to receive a solid tire, the tire being shown in dotted lines and its base being shown in full lines; Fig. 2 is a section on the line 2—2 of Fig. 1;—Fig. 3 is an enlarged cross section of the rim portion of the wheel with the tire in place, as on the line 3—3 of Fig. 1;—Fig. 4 is a section on the line 4—4 of Fig. 3, viewed in the direction of the arrow;—Fig. 5 is a sectional view like Fig. 3, but showing a wider peripheral member for the reception of the "pressed-on" tire base.

The parts, 2, 2, appearing in the several figures of the drawings, are wooden spokes. These have mitered butts, 3, which together comprise the wooden hub center of the wheel and contain the hub hole, 3'. The metal hub, 4 is shown by dotted lines in Fig. 2. Each radial wooden spoke terminates in a slightly arched, flat, or substantially flat, surface, 5, which preferably is of the full cross section of the spoke; instead of being tenoned, as is usual.

It will at once be noted that my wheel has no wooden felly nor a felly band; and no part which corresponds thereto in relation to the spokes and the rim. Instead I employ a single metal part, 6, which constitutes the fixed rim of the wheel and at the same time takes the place of and performs all the useful functions of the old style felly and felly-band. This single metal part is supported directly upon the ends of the radial wooden spokes; and therewith completes the wheel. As will be explained, the metal rim part, 6, is pressed or shrunk upon the spokes and thus is most firmly bound thereon. Relatively minute fastenings are added by way of precaution, as hereinafter explained; but the circumferential tension and consequent frictional engagement of the metal rim upon the wooden spokes affords the best part of the strength of engagement between them. Incidentally the fixed metal rim, 6, completely seals the end grain of the wooden spokes, through serving as the cover or cap for each thereof; which greatly adds to the life of the wheel.

Referring now to Figs. 1 to 4: The peripheral member or fixed rim, 6, is made of a strip of initially flat rolled steel which is shaped to an endless ring of the form shown and placed directly upon the ends of the wooden spokes, 2, and which is fixed thereon by novel means, of an added or precautionary nature, as before mentioned. Even when provided with a tire base stop flange, such as shown at 7 in Fig. 5, the member, 6, presents a cylindrical outer periphery suited to the reception of various kinds of pressed on tire rims and bases. To this extent it resembles the ordinary S. A. E. band, but except for this standard relation to the tire rim, the rim, 6, is totally different from all others that have been produced in the art; in that it has an integral flange, 6ª, which extends inwardly from its outer edge, and made by rolling the flat steel stock to that shape; and this flange is also shaped or deformed in a novel manner, which adapts it to serve as a device that spaces the wooden spokes circumferentially and as a fastening or anchorage between the spoke-ends and the rim, 6. The flange, 6ª, engages the outer faces or sides of the wooden spokes to resist the axially directed thrust or stress which tends to displace the rim upon the spokes.

The flange, 6ª, preferably is made perpendicular to the body of the rim, or substantially so, in the operation of rolling the rim stock to hoop or ring form. It will be understood that such flat strip stock received from the mill in flat condition, is "hooped up" and rolled in a rim-rolling machine of conventional form and that the initially open ring thus formed, is immediately welded to complete an endless ring of the cross-section shown by full lines in Fig. 3. At that time the part, 6ª, appears as an endless radial flange at the edge of the cylindrical or body portion of the member, 6. After reaching this stage, the flange, 6ª, is acted upon by dies which deform the flange and give it the cross-sectional shape best indicated in Figs. 1, 3, and 4;—that is, it is formed into a series of inwardly opening spoke sockets, 8, which are circumferentially spaced about the rim, and into an equal number of intermediate portions, 9, all obviously integral with the base body of the rim. The portions, 8, receive the spokes and the portions, 9, give the wheel the appearance of having a felly. Specifically the portions, 6ᵇ, of the flange are left in perpendicular relation to the inner periphery of the rim and hence in position to snugly fit the sides of respective spokes, 2; whereas, the intermediate portions, 9, are bent back beneath the body of the rim, preferably upon arcs which conform to the curvature of the body of the rim. The spoke sockets may be curved, rectangular or other shape as determined by the cross-sectional shape of the spokes, 2.

When the parts are assembled, the spoke sockets receive and circumferentially space the spoke ends about the rim, 6, and also provide the many positive driving connections or abutments, 6², between the spokes and the rim, thus greatly augmenting the strength of the frictional engagement between those parts.

As a further precautionary measure, I bind each spoke in its spoke socket in a positive manner; as by means of one or more rivets which pass through the spoke and through the face portion, 6ᵇ, of the flange, 6ª, as well shown in the several figures of the drawings. The rivets may have washer plates (11) or T heads (12) at their back or inner ends and in either case the spoke end being grasped and practically encompassed by metal, is prevented from splitting or cracking.

Thus I complete a wheel proper of little weight at the periphery and of great simplicity, strength, resiliency, and durability; the same comprising a desired number of wooden spokes and a single metallic peripheral member; to which may be added one or more small rivets or bolts per spoke.

In constructing these wheels I first form the circumferential or peripheral metal member and socket or deform its inner peripheral flange as hereinbefore described; incidentally "sizing" (either stretching or compressing) the member to a uniform circumferential dimension as is common in the present-day manufacture of tire rims and bases. I then follow preferably one or the other of two methods of assembly which I have devised. Under the first method and having assembled the spokes in correct number and radial relation, I drive or forcibly press the wooden body thus formed into the circular rim member, taking care that the spokes shall "land" in the sockets thereof; following which the spokes are bored and the rivets are secured therein, which action completes the wheel proper ready for the reception of the metal tire base. Under the second method, the operation is modified to the extent of heating the metal rim to temporarily increase its circumference and thus facilitate its assembly with the spokes. In both cases the rim is left in strong circumferential tension, even after the spoke miters have been driven firmly inward and together. This inward driving of the spokes by the action of the encompassing metal member not only results in the formation of a wheel of great initial rigidity at the hub, but also insures the permanent maintenance of such rigidity or solidity in the hub portion of the wheel, as well as insuring a permanent and close butt-joint between the end of each spoke and the peripheral metal member.

Having thus described my invention, I claim as new and desire to secure by Letters Patent:

A semi-wood wheel for motor vehicles comprising an endless metal tire base, in combination with a metal ring which is in permanent firm frictional engagement with the inner periphery of said base, said ring being provided with an inwardly extending flange which at intervals is shaped into spoke-retaining sockets and intermediate felly-forming flanges, a body of wooden spokes radiating from a common center, said spokes being of the same number as the sockets in said flanges and having their ends held in respective sockets, metal fastenings individually securing said spokes in respective socketed portions of said flange, the ends of said spokes being presented to and sealed by the inner periphery of said ring, and the body of spokes as a whole being held under compression by the combined tension of said ring and said tire base.

In testimony whereof, I have hereunto set my hand this 2nd day of November, 1918.

ERLE KING BAKER,